(12) United States Patent
Baldwin

(10) Patent No.: US 7,303,500 B2
(45) Date of Patent: Dec. 4, 2007

(54) MULTIPLE-SPEED AUTOMATIC TRANSMISSION

(75) Inventor: Reid Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 223 days.

(21) Appl. No.: 11/311,031

(22) Filed: Dec. 16, 2005

(65) Prior Publication Data

US 2007/0142158 A1    Jun. 21, 2007

(51) Int. Cl.
F16H 3/62 (2006.01)
(52) U.S. Cl. .................. 475/276; 475/280; 475/281
(58) Field of Classification Search ............. 475/207, 475/218, 219, 280, 281
See application file for complete search history.

(56) References Cited

U.S. PATENT DOCUMENTS

| | | | |
|---|---|---|---|
| 4,200,006 A * | 4/1980 | Ehrlinger et al. ............ 475/219 |
| 5,106,352 A * | 4/1992 | Lepelletier .................. 475/280 |
| 5,383,822 A * | 1/1995 | Pierce ......................... 475/281 |
| 5,593,359 A * | 1/1997 | Justice et al. ................ 475/280 |
| 6,514,170 B1 | 2/2003 | Kao et al. |
| 6,565,470 B2 * | 5/2003 | Ohkubo ........................ 475/66 |
| 6,626,789 B2 | 9/2003 | Raghavan et al. |
| 6,709,360 B2 | 3/2004 | Raghavan et al. |
| 6,733,412 B2 * | 5/2004 | Kumagai et al. ............ 475/218 |
| 6,780,138 B2 | 8/2004 | Raghavan et al. |
| 6,913,556 B2 * | 7/2005 | Armstrong et al. ......... 475/269 |
| 6,916,268 B2 * | 7/2005 | Ohkubo ....................... 475/302 |
| 6,926,635 B2 * | 8/2005 | Biermann .................... 475/296 |

| | | | |
|---|---|---|---|
| 2003/0054917 A1 | 3/2003 | Raghaven et al. |
| 2003/0087719 A1 | 5/2003 | Usoro et al. |
| 2003/0224898 A1 | 12/2003 | Bucknor et al. |
| 2004/0053735 A1 | 3/2004 | Usoro et al. |
| 2005/0026742 A1 | 2/2005 | Tiesler et al. |
| 2005/0070398 A1 | 3/2005 | Kao et al. |

* cited by examiner

Primary Examiner—Sherry Estremsky
(74) Attorney, Agent, or Firm—David B. Kelley; MacMillan Sobanski & Todd, LLC

(57) ABSTRACT

A multiple speed transmission having an input and output includes a first and second planetary gearsets, each gearset including a sun gear, a ring gear surrounding the sun gear, a set of planet pinions meshing with the sun gear and the ring gear, and a carrier on which the planet pinions are rotatably supported, the carrier of the first gearset being driveably connected to the ring gear of the second gearset. A third gearset, driveably connected to the carrier of the second gearset and the ring gear of the first gearset, alternately drives the output at a predetermined lower speed relative to a speed of the carrier of the second gearset, and driving the output at substantially the speed of the ring gear of the first gearset. A first clutch connects and disconnects the input and the sun gear of the first gearset. A second clutch connects and disconnects the input and the sun gear of the second gearset. A third clutch alternately connects and disconnects the input and the carrier of the first gearset. An overrunning brake holds the carrier of the first gearset against rotation on the transmission housing and releases the carrier of the first gearset. A first brake holds the sun gear of the first gearset against rotation on the transmission housing and releases the sun gear of the first gearset. A second brake holds the carrier of the first gearset against rotation on the housing and releases the carrier of the first gearset.

17 Claims, 3 Drawing Sheets

| | 54 | 56 | 58 | 74 | 80 | 78 |
|---|---|---|---|---|---|---|
| Rev | | X | | | X | - |
| 1 | X | | | | | X |
| 1 alternate | X | | | | X | |
| 2 | X | | | X | | OR |
| 3 | X | X | | | | OR |
| 4 | X | | X | | | OR |
| 5 | | X | X | | | OR |
| 6 | | | X | X | | OR |

| | Beta | Sun | Planet | Ring | N1 | N2 | N3 | N4 |
|---|---|---|---|---|---|---|---|---|
| Set 1 | 3.889 | 27 | 39 | 105 | 50 | 67 | 49 | 50 |
| Set 2 | 2.630 | 27 | 22 | 71 | N1/N2 | 0.746 | N3/N4 | 0.980 |

| | 54 | 56 | 58 | 74 | 108 | 78 |
|---|---|---|---|---|---|---|
| Rev | | X | | | X | - |
| 1 | X | | | | | X |
| 2 | X | | | X | | OR |
| 3 | X | X | | | | OR |
| 4 | X | | X | | | OR |
| 5 | | X | X | | | OR |
| 6 | | | X | X | | OR |

| | Beta | Sun | Planet | Ring |
|---|---|---|---|---|
| Set 1 | 3.963 | 27 | 40 | 107 |
| Set 2 | 2.259 | 27 | 17 | 61 |
| Set 3 | 3.100 | 20 | 21 | 62 |

|   | 54 | 56 | 58 | 74 | 108 | 78 |
|---|---|---|---|---|---|---|
| Rev |  | X |  |  | X | - |
| 1 | X |  |  |  |  | X |
| 2 | X |  |  | X |  | OR |
| 3 | X | X |  |  |  | OR |
| 4 | X |  | X |  |  | OR |
| 5 |  | X | X |  |  | OR |
| 6 |  |  | X | X |  | OR |

|   | Beta | Sun | Planet | Ring |
|---|---|---|---|---|
| Set 1 | 3.100 | 20 | 21 | 62 |
| Set 2 | 2.167 | 24 | 14 | 52 |
| Set 3 | 2.500 | 20 | 15 | 50 |

MULTIPLE-SPEED AUTOMATIC TRANSMISSION

BACKGROUND OF THE INVENTION

This invention relates to the field of automatic transmissions for motor vehicles. More particularly, the invention pertains to a kinematic arrangement of gearing, clutches, brakes, and the interconnections among them in such transmissions.

The number of forward drive speed ratios in automatic transmissions for motor vehicle has continued to increase due to the need to increase fuel economy and to avoid large steps between the speed ratios. Each known six-speed transmission in which no more than three gearsets and five friction elements (the clutches and brakes that control operation of the transmission) are employed has some drawbacks such as ratio progression, shared pinions, etc.

U.S. Pat. No. 5,106,352 describes a multi-speed automatic transmission for motor vehicles that includes two parallel gearsets providing two fixed speed ratios. The second speed ratio is higher than the first speed ratio. A first power path using the first fixed speed ratio includes a first control clutch and a second control clutch, and a second power path using the second fixed speed ratio includes a third control clutch. Several embodiments of the transmission include a double planetary gearset; other embodiments disclose a Ravigneaux gearset, a first control brake and a second control brake. Alternatively, the input shaft and output shaft are in alignment and one of the two speed ratios is a direct drive.

Experience in manufacturing Ravigneaux gearsets for automatic transmissions has shown that these gearsets tend to produce relatively high gear noise in comparison to simple planetary gearsets and Simpson gearsets. To minimize gear noise, extensive steps are taken during the manufacturing process to grind the gears. But these steps and the additional complexity associated with assembling Ravigneaux gearsets add cost to the transmission.

There is a need for a six-speed automatic transmission in which the planetary gearsets are entirely simple planetary gearsets rather than double pinion gearsets or shared pinion gearsets. Preferably such a transmission would require no more than five hydraulically-actuated friction clutches and brakes to produce step changes among the speed ratios.

SUMMARY OF THE INVENTION

A multiple speed transmission according to the present invention having an input and output includes first and second planetary gearsets, each gearset including a sun gear, a ring gear surrounding the sun gear, a set of planet pinions meshing with the sun gear and the ring gear, and a carrier on which the planet pinions are rotatably supported, the carrier of the first gearset being driveably connected to the ring gear of the second gearset. A third gearset, driveably connected to the carrier of the second gearset and the ring gear of the first gearset, alternately drives the output at a predetermined lower speed relative to a speed of the carrier of the second gearset, and driving the output at substantially the speed of the ring gear of the first gearset. A first clutch connects and disconnects the input and the sun gear of the first gearset. A second clutch connects and disconnects the input and the sun gear of the second gearset. A third clutch alternately connects and disconnects the input and the carrier of the first gearset. An overrunning brake holds the carrier of the first gearset against rotation on the transmission housing and releases the carrier of the first gearset. A first brake holds the sun gear of the first gearset against rotation on the transmission housing and releases the sun gear of the first gearset. A second brake holds the carrier of the first gearset against rotation on the housing and releases the carrier of the first gearset.

A transmission mechanism according to this invention uses only simple planetary gearsets, as opposed to double pinion gearsets or shared pinion gearsets. A front wheel drive embodiment uses only two simple planetary gearsets and an additional gear pair, whereas most arrangements require three simple gearsets or a simple gearset and a Ravigneaux gearset.

The transmission can be applied readily to a vehicle powertrain for which it is an advantage to provide alternately one overdrive speed ratio and two overdrive speed ratios, each application having a direct drive speed ratio.

DESCRIPTION OF THE DRAWINGS

These and other advantages of the present invention will become readily. apparent to those skilled in the art from the following detailed description of a preferred embodiment when considered in the light of the accompanying drawings in which.

DESCRIPTION OF THE PREFERRED EMBODIMENT

Figures 1, 2, 3:
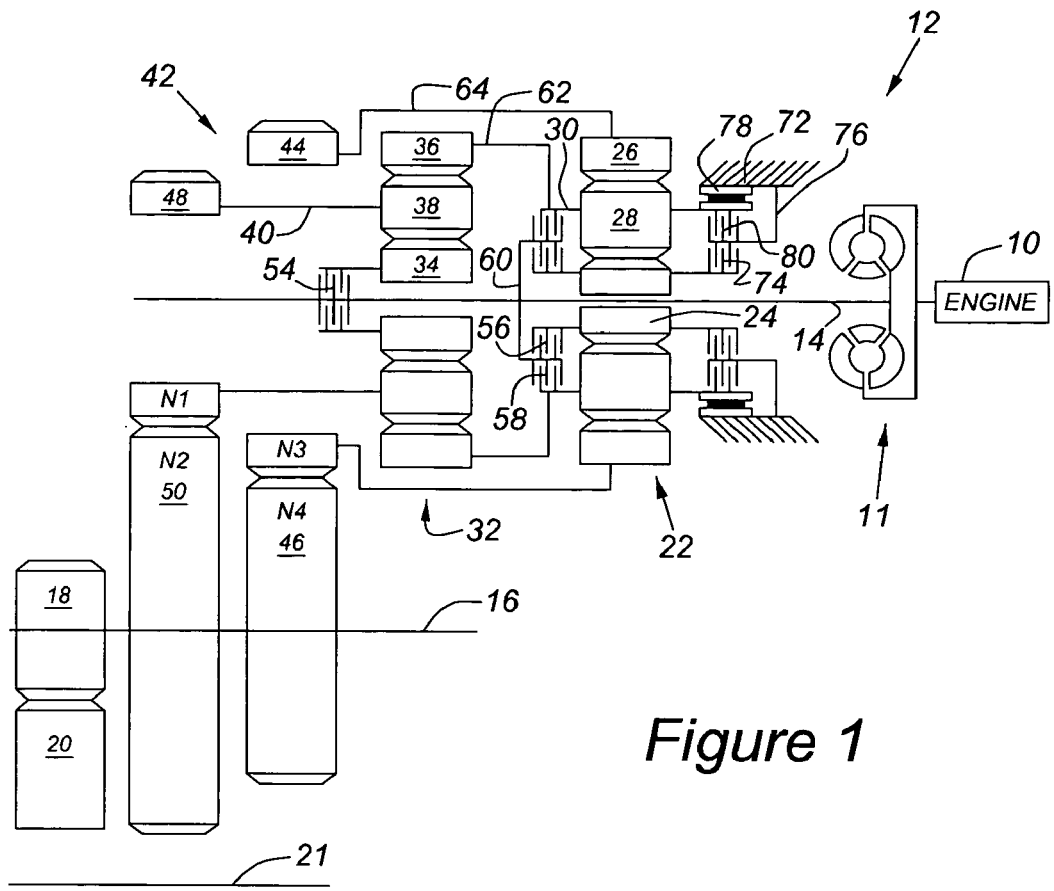
FIG. 1 is a schematic diagram of a transmission embodiment of the present invention.
FIG. 2 is a table that shows the engaged and disengaged states of the friction clutches and friction brakes, and the driving and overrunning states of the one-way brake for each of the forward and reverse speed ratios of the transmission shown in FIG. 1.
FIG. 3 is a chart containing an example of the beta ratios and number of teeth of the gears and pinions of the transmission shown in FIG. 1.

Referring to FIG. 1, an automotive powertrain includes an engine 10 or other power source and a torque converter 11, which produces a fluid drive connection 30 between the engine and an automatic, step-change transmission 12 through an input shaft 14. The output 16 of the transmission is driveably connected to a final drive gearset, which includes a final drive pinion 18 supported on the output shaft 16, and a final drive gear 20 in continuous meshing engagement with the final drive pinion 18.

Transmission 12 includes the first simple planetary gearset 22, which includes a sun gear 24 journalled on the input 14, a ring gear 26 surrounding the sun gear and having its center on input 14, a first set of planet pinions 28 in continuous meshing engagement with sun gear 24 and ring gear 26 and rotatably supported on a carrier 30.

A second simple planetary gearset 32, arranged coaxially with the first gearset 22 and input 14, includes a sun gear 34, journalled on input 14, ring gear 36 surrounding sun gear 34, a set of planet pinions 38 in continuous meshing engagement with sun gear 34 and ring gear 36 and rotatably supported on a carrier 40.

A third gear unit 42 includes two layshaft gear pairs. The first pair includes a pinion 44 in continuous meshing engagement with a gear 46; the second gear pair includes a pinion 48 in continuous meshing engagement with a gear 50. Both gears 46 and 50 are secured to the output 16, and they drive the final drive pinion 18.

The input 14 is driveably connected and disconnected alternately to sun gear 34 through operation of a clutch 54. Input 14 is driveably connected and disconnected alternately to sun gear 24 through operation of a clutch 56. Similarly, input 14 is driveably connected and disconnected alternately to the carrier 30 through operation of a clutch 58. Sun gear 24 is grounded or held against rotation on the transmission housing 72 through connecting member 76 when brake 74 is applied. A one-way brake (OWB) 78 holds carrier 30 against rotation on housing 72 when the brake 78 produces a drive connection, and disconnects carrier 30 from the housing 72 when the brake 78 overruns.

Input 14 is driveably connected to clutches 56 and 58 by a connecting member 60. Carrier 30 is driveably connected to ring gear 36 by a connecting member 62. Ring gear 26 is driveably connected to pinion 44 by a connecting member 64. Carrier 40 is driveably connected to pinion 48.

Beta is the ratio of the ring gear/sun gear tooth ratios for the first and second gearsets 22, 32 (R1/S1, and R2/S2), respectively. Beta, for the second gearset 22 is 2.630. The table of FIG. 2 shows the combinations of engagements for the torque-transmitting mechanisms that establish six forward speed ratios and one reverse speed ratio between the input 14 and the output shaft 16.

The transmission 12 operates in the first forward ratio when clutch 54 is engaged. This causes one-way brake 78 to produce a drive connection between carrier 30 and the housing 72 and to hold carrier 30 and ring gear 36 against rotation. With the input 14 driving sun gear 34 and ring gear 36 held to provide a torque reaction, carrier 40 and pinion 48 are driven at a slower speed than that of input 14. The third gearset produces an additional speed reduction through pinion 48 and gear 50. The ratio of the speed of output 16 to the speed of input 14 is 0.206 when the gears and pinions are sized as shown in the example of FIG. 3.

An upshift to the second speed ratio is produced by maintaining clutch 54 engaged and engaging brake 74. These actions cause OWB 78 to overrun, and sun gear 24 to be held against rotation on the housing 72. Carrier 40 and pinion 48 are underdriven at a speed ratio of 0.491 with respect to the speed of input 14, and output gear 50 is underdriven compared to the speed of pinion 48. The output speed ratio is 0.366 when the gears and pinions are sized as shown in the example of FIG. 3.

An upshift to the third forward speed ratio is produced by maintaining clutch 54 engaged, disengaging brake 74, and engaging clutch 56. OWB 78 overruns, and ring gear 36 is driveably connected to carrier 30. The output is taken at carrier 40 and pinion 48, which rotate at 0.755 times the speed of input 14. An additional speed reduction occurs in the third gearset 42, causing the output 16 to rotate at 0.563 times the speed of the input, when the gears and pinions are sized as shown in FIG. 3.

An upshift to the fourth speed ratio occurs when clutch 54 remains engaged, clutch 56 is disengaged, and clutch 58 is engaged. With the control elements in these states, OWB 78 overruns, sun gear 34 and ring gear 36 of the second planetary gearset 32 rotate at the speed of the input; therefore, carrier 40 rotates at the speed of input 14, a direct drive condition. Ring gear 26 and pinion 44 rotate at 0.761 times the speed of input 14. The output 16 rotates at 0.746 times the speed of input 14, when the gears and pinions are sized as shown in FIG. 3, due to the speed reduction that occurs in the third gearset 42 between pinion 48 and gear 50.

An upshift to the fifth speed ratio occurs when clutch 54 is disengaged, clutch 56 is engaged, and clutch 58 remains engaged. With the control elements in these states, OWB 78 overruns, and sun gear 24 and carrier 30 rotate at the speed of input 14, which action locks up the first gearset 22 and causing ring gear 26 and pinion 44 to rotate at the speed of input 14. A speed reduction occurs in the third gearset 42, causing gear 46 and output to 16 to rotate at 0.98 times the speed of input 14 due to the speed reduction that occurs in the third gearset 42 between pinion 44 and gear 46.

An upshift to the sixth speed ratio occurs when clutch 56 is disengaged, brake 74 is engaged, and clutch 58 remains engaged. With the control elements in these states, OWB 78 overruns, and carrier 30 and ring gear 36 are driven at the speed of input 14, and sun gear 24 is held against rotation on the transmission housing 72 due to the engagement of brake 74. Ring gear 26 and pinion 44 are overdriven 1.257 times the speed of input 14. The speed reduction that occurs in the third gearset 42 between pinion 44 and gear 46 causes gear 46 and output 16 to rotate at 1.232 times the speed of input 14.

Reverse drive is produced by engaging clutch 56 and brake 80. When the control elements are in these states, OWB 78 free wheels, neither overrunning nor driving because carrier 30 is held against rotation on the transmission housing 72 due to engagement of brake 80. Sun gear 24 rotates at the speed of input 14. A speed reduction occurs in the first gear set 22 causing ring gear 26 and pinion 44 to rotate opposite the direction of input 14 and at 0.257 times the speed of input 14. Due to the speed reduction that occurs in the third gearset 42 between pinion 44 and gear 46, output 16 and gear 46 rotate at 0.252 times the speed of input 14 when the gears and pinions are sized as shown in FIG. 3.

Alternatively, OWB 78 may be omitted from this transmission. If OWB 78 is omitted, the transmission is operated in the first forward speed ratio by engaging clutch 54 and brake 80. In this instance, to shift from the first speed ratio to the second speed ratio, clutch 54 remains engaged while brake 80 is released and brake 74 is engaged. The remainder of the operation is identical to the above description.

Figures 4, 5, 6:
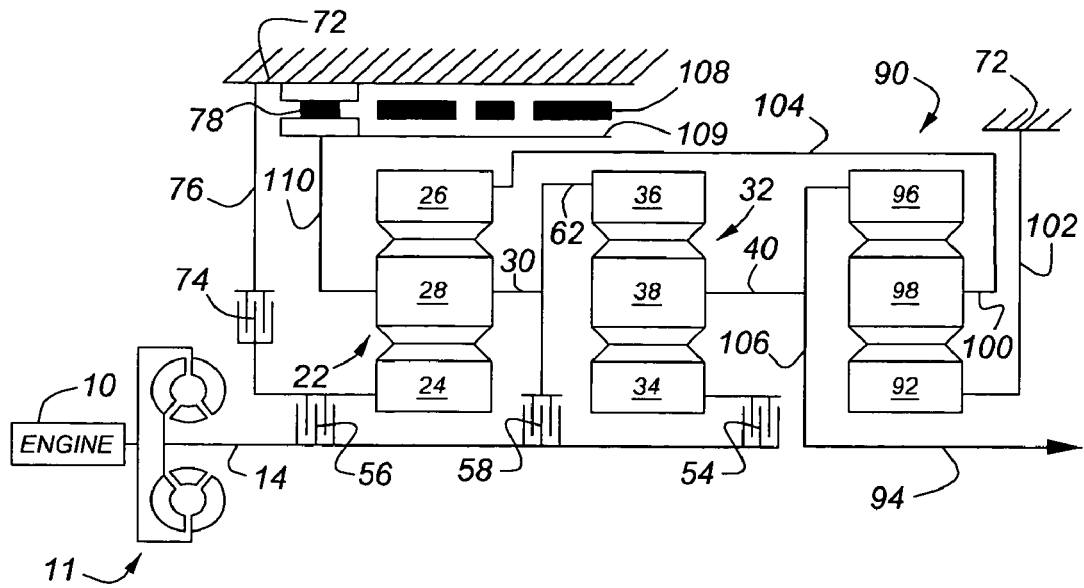
FIG. 4 is a schematic diagram of a transmission embodiment of the present invention.
FIG. 5 is a table that shows the engaged and disengaged states of the friction clutches and friction brakes, and the driving and overrunning states of the one-way brake for each of the forward and reverse speed ratios of the transmission shown in FIG. 4.
FIG. 6 is a chart containing an example of the beta ratios and number of teeth of the gears and pinions of the transmission shown in FIG. 4.

Turning now to FIG. 4 in which components identical to those in FIG. 1 have been marked with the same identifying numerals, a third planetary gearset 90 includes a sun gear 92 journalled on an output 94, a ring gear 96 surrounding the sun gear 92, and a set the planet pinions 98 in continual meshing engagement with sun gear 92 and ring gear 96 and supported rotatably on a carrier 100. Sun gear 92 is held against rotation on transmission housing 72 by connecting element 102. Carrier 100 is driveably connected by connecting element 104 to ring gear 26. Ring gear 96 is driveably connected to carrier 40 and to output 94 by the connecting element 106.

A hydraulically-actuated brake band 108 alternately holds carrier 30 against rotation on the transmission housing 72 and releases carrier 30 to rotate freely. When brake band 108 is applied, connecting member 109 is frictionally engaged by the brake band and held on the transmission housing 72. Carrier 30 is driveably connected to OWB 78 and connecting member 109 by connecting member 110.

Referring now to FIGS. 4-6, the transmission of FIG. 4 operates in the first forward speed ratio by engaging clutch 54, which causes OWB 78 to produce a drive connection between carrier 30 and housing 72, thereby holding carrier 30 and ring gear 36 against rotation. With sun gear 34 driven at the speed of input 14 and ring gear 36 providing a torque reaction, carrier 40 and ring gear 96 are underdriven in relation to the speed of input 14 at 0.307 times the speed of input 14, when the gears and pinions of the planetary gear sets are sized as shown in FIG. 6.

An upshift to the second speed ratio occurs by maintaining clutch 54 and engaging brake 74, which causes OWB 78 to overrun and holds sun gear 24 against rotation. Sun gear 34 is driven at the speed of input 14, and sun gears 24 and 92 are held against rotation. Speed reduction is produced such that carrier 40, ring gear 96 and output 94 rotate at 0.528 times the speed of input 14 when the gears and pinions are sized as shown in FIG. 6.

An upshift to the third speed ratio occurs by maintaining clutch 54 engaged, engaging clutch 56, and disengaging brake 74, which causes OWB 78 to overrun and driveably connects sun gears 24 and 34 to input 14. Speed reduction is produced which causes carrier 40, ring gear 96, and output 94 to be driven at 0.768 when the transmission components are sized as shown in FIG. 6.

An upshift to the fourth speed ratio is produced by maintaining clutch 54 engaged, disengaging clutch 56, engaging clutch 58, which causes one-way brake 78 to overrun and driveably connects the sun gear 34 and ring gear 36 of the second gearset 32 to the input 14. This locks-up gearset 32 causing its carrier 40, ring gear 96, and output 94 to rotate at the speed of input 14, a direct drive condition.

At first overspeed ratio is produced in the fifth gear by disengaging clutch 54, engaging clutch 56, and maintaining clutch 58 engaged, thereby causing one-way brake 78 to overrun. With carrier 30 and sun gear 24 of the first planetary gear set 22 rotating at the speed of input 14, ring gears 26 and 36 and carrier 100 also rotate at the speed of input 14. Carrier 40, ring gear 96, and output 94 are overdriven at 1.323 times the speed of input 14 when the components of the gear sets are sized as shown in FIG. 6 due to the speed increase that occurs in the third gearset 90.

A second overspeed condition occurs in the sixth gear upon maintaining clutch 58 engaged, disengaging clutch 56, and engaging brake 74 which causes one-way brake 78 to overrun. With the control elements so disposed, OWB 78 overruns, sun gear 24 is held against rotation due to the engagement of brake 74, and carrier 30 and ring gear 36 rotate at the speed of input 14. A speed increase occurs in gearset 22 due to sun gear 24 being held against rotation, thereby causing ring gear 26 and carrier 100 to rotate at 1.252 times the speed of input 14. With sun gear 92 held fixed against rotation and carrier 100 being drive by ring gear 26, ring gear 96 and output 94 rotate at 1.656 times the speed of input 14 due to the speed increase that occurs in the third gearset 90 when the components of the gear sets are sized as shown in FIG. 6.

The transmission of FIG. 4 operates in reverse drive upon engaging clutch 56 and brake band 108, which causes carrier 30 to be held against rotation. A first speed reduction in a first direction occurs in the first gearset 22 with carrier 30 held against rotation and sun gear 24 rotating at the speed of input 14. Ring gear 26 and carrier 100 rotate in the reverse direction at 0.252 times the speed of input 14. A speed increase occurs in the third planetary gearset 90 due to its sun gear 92 being fixed against rotation. Therefore, ring gear 96 and output 94 are driven at −0.334 times the speed of input 14 when the components of the gear sets are sized as shown in FIG. 6.

Figures 7, 8, 9:
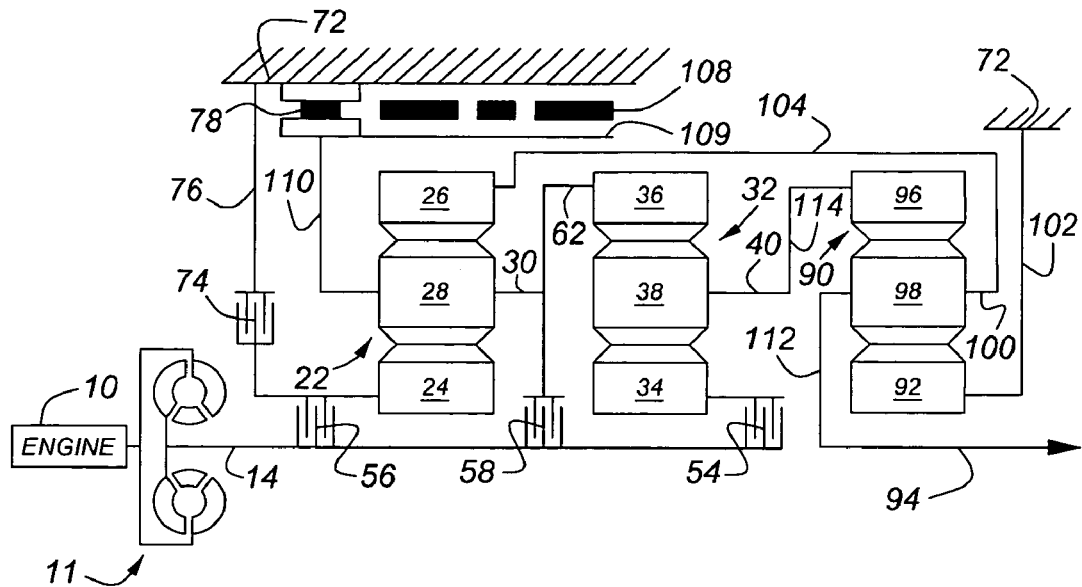
FIG. 7 is a schematic diagram of a transmission embodiment of the present invention.
FIG. 8 is a table that shows the engaged and disengaged states of the friction clutches and friction brakes, and the driving and overrunning states of the one-way brake for each of the forward and reverse speed ratios of the transmission shown in FIG. 7.
FIG. 9 is a chart containing an example of the beta ratios and number of teeth of the gears and pinions of the transmission shown in FIG. 7.

Turning now to the transmission shown in FIG. 7, wherein the same components as those of FIG. 4 are marked with the identical reference numbers, carrier 30 is driveably connected to one-way brake 78 through connecting member 110, connecting member 112 driveably connects carrier 100 of the third gear unit 90 to the output 94, and connecting member 114 driveably connects carrier 40 of the second gear unit 32 to the ring gear 96.

The transmission of FIG. 7 produces the first speed ratio by engaging clutch 54 and disengaging the other friction control elements, which connects sun gear 34 to the input 14, and causes overrunning brake 78 to produce a drive connection between carrier 30 and the transmission housing 72. A first speed reduction is produced in the second gear unit 32 due to its ring gear 36 being held fixed against rotation and sun gear 34 being driveably connected to the input 14. Carrier 40 is underdriven in relation to the speed of input 14. A second speed reduction occurs in the third gearset 90 due to its ring gear 96 being driven at the speed of carrier 40 at 0.316 times the speed of input 14, and its sun gear 92 being fixed against rotation. Carrier 98 and output 94 rotate at 0.226 times the speed of input 14 with the pinions and gears sized as shown in FIG. 9.

An upshift to the second speed ratio is produced by maintaining clutch 54 engaged and engaging brake 74, which causes overrunning brake 78 to overrun and holds sun gear 24 fixed against rotation. With the friction control elements so disposed, sun gear 24 and sun gear 92 fixed against rotation, and sun gear 34 rotating at the speed of input 14, carrier 100 and output 94 rotate at 0.358 times the speed of input 14 with the pinions and gears sized as shown in FIG. 9.

An upshift to the third forward speed ratio occurs by maintaining clutch 54 15 engaged, disengaging brake 74, and engaging clutch 56, which causes one-way brake 78 to overrun. With sun gear 92 fixed against rotation and sun gears 24 and 34 rotating at the speed of input 14, carrier 100 and output 94 rotate at 0.547 times the speed of input 14 when the components of the gearsets are sized as shown in FIG. 9.

An upshift to the fourth speed ratio occurs by maintaining clutch 54 engaged, 20 disengaging clutch 56, and engaging clutch 58, which causes one-way brake 78 to overrun. Sun gear 92 is fixed to the transmission housing 72 providing a torque reaction. The second gearset 32 is locked-up due to its sun gear 34 being driveably connected through clutch 54 to input 14 and its ring gear 36 being driveably connected to the input through clutch 58. A speed reduction occurs in the third gearset 90, whose ring gear 96 rotates at the speed of input 14 and whose sun gear 92 is fixed against rotation. Therefore, carrier 100 is and output 94 rotate at 0.714 times the speed of input 14 when the components of the gearsets are sized as shown in FIG. 9.

The transmission operates in direct drive in the fifth gear ratio upon disengaging clutch 54, engaging clutch 56, and maintaining clutch 58 engaged so that one-way brake 78 overruns. With the friction control element so disposed, the first gearset 22 is locked-up because sun gear 24 and carrier 30 are driveably connected to input 14 through clutches 56 and 58, respectively. Therefore, ring gear 26, and carrier 100 and output 94 rotate at the speed of input 14.

The transmission of FIG. 7 is upshifted to an overdrive speed when clutch 56 is disengaged, 58 remains engaged, and brake 74 is engaged, thereby causing OWB 78 to overrun and holding sun gear 24 fixed against rotation. With the friction control element so disposed, carrier 30 rotates at the speed of input 14 and a speed increase occurs in the first gearset 22 causing ring gear 26, carrier 100 and output 94 to rotate at 1.323 times the speed of input 14 when the gears and pinions are sized as shown in FIG. 9.

The transmission of FIG. 7 operates in reverse drive when clutch 56 is engaged and brake band 108 is engaged. These actions cause one-way brake 78 to freewheel and sun gear 24 to be held fixed due to the engagement of brake band 108. A reverse speed reduction occurs in the first gearset 22 such that ring gear 26, carrier 100, and output 94 rotate in the reverse direction at −0.323 times the speed of input 14.

The friction control elements 55, 56, 58 are preferably torque-transmitting devices of the rotating type, commonly termed clutches. These devices are hydraulically-actuated friction devices well known in the art of power transmissions. The friction control element 74 is preferably a hydraulically-actuated torque-transmitting device of the stationary type, commonly termed a brake and also well known in the art. The brake 74 and clutches 55, 56, 58 are preferably disc-type brakes. The brake 108 is preferably a hydraulically-actuated torque-transmitting device of the stationary type, commonly termed a band brake, in which the friction surface of a band surrounds a brake drum and alternately engages and disengages the drum. The OWB 78 is an overrunning brake, preferably a mechanical device produce a drive connection between its input and output depending on the relative speeds of the input and output. Rollers, sprags, rockers, pawls, etc, located between the input and output may be used to produce the drive connection.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A multiple speed transmission mechanism comprising:
   an input;
   an output;
   a first and second planetary gearsets, each gearset including a sun gear, a ring gear surrounding the sun gear, a set of planet pinions meshing with the sun gear and the ring gear, and a carrier on which the planet pinions are rotatably supported, the carrier of the first gearset being driveably connected to the ring gear of the second gearset;
   a third gearset comprising a first pinion driveably connected to the ring gear of the first gearset and a first gear driveably connected to the output and driveably engaged with the first pinion, and a second pinion driveably connected to the carrier of the second gearset and a second gear driveably connected to the output driveably engaged with the second pinion;
   a first clutch for alternately driveably connecting and disconnecting the input and the sun gear of the first gearset;
   a second clutch for alternately driveably connecting and disconnecting the input and the sun gear of the second gearset;
   a third clutch for alternately driveably connecting and disconnecting the input and the carrier of the first gearset;
   a first brake for alternately holding the sun gear of the first gearset against rotation on the transmission housing and releasing the sun gear of the first gearset; and
   a second brake for alternately holding the carrier of the first gearset against rotation on the transmission housing and releasing the carrier of the first gearset.

2. The transmission mechanism of claim 1 wherein:
   the first clutch, second clutch and third clutch are hydraulically-actuated, friction disc clutches; and
   the first brake and second brake are hydraulically-actuated, friction disc brakes.

3. The transmission mechanism of claim 1 wherein:
   the sun gear of the first gearset and the sun gear of the second gearset are journalled on the input.

4. The transmission mechanism of claim 1 wherein:
   the first clutch and second clutch are axially aligned mutually about the input.

5. The transmission mechanism of claim 1 further comprising:
   an overrunning brake for alternately holding the carrier of the first gearset against rotation on the transmission housing and releasing the carrier of the first gearset.

6. The transmission mechanism of claim 5 wherein:
   the brake and the overrunning brake are axially aligned mutually about the input.

7. The transmission mechanism of claim 1 further comprising:
   a final drive gearset comprising a third pinion driveably connected to the output and a third gear driveably engaged with the third pinion.

8. A multiple speed transmission mechanism comprising:
   an input;
   an output;
   a first, second and third planetary gearsets, each gearset including a sun gear, a ring gear surrounding the sun gear, a set of planet pinions meshing with the sun gear and the ring gear, and a carrier on which the planet pinions are rotatably supported, the carrier of the first gearset being driveably connected to the ring gear of the second gearset, the ring gear of the first gearset being driveably connected to the carrier of the third gearset, the carrier of the second gearset being driveably connected to the ring gear of the third gearset, the sun gear of the third gearset being fixed against rotation, and the output being driveably connected to one of the ring gear of the third gearset and the carrier of the third gearset;
   a first clutch for alternately driveably connecting and disconnecting the input and the sun gear of the first gearset;
   a second clutch for alternately driveably connecting and disconnecting the input and the sun gear of the second gearset;
   a third clutch for alternately driveably connecting and disconnecting the input and the carrier of the first gearset;
   an overrunning brake for alternately holding the carrier of the first gearset against rotation on the transmission housing and releasing the carrier of the first gearset;
   a first brake for alternately holding the sun gear of the first gearset against rotation on the transmission housing and releasing the sun gear of the first gearset; and a second brake for alternately holding the carrier of the first gearset against rotation on the transmission housing and releasing the carrier of the first gearset.

9. The transmission mechanism of claim 8 wherein:
the first clutch, second clutch and third clutches are hydraulically-actuated, friction disc clutches.

10. The transmission mechanism of claim 8 wherein:
the first brake is a hydraulically-actuated, friction disc brake.

11. The transmission mechanism of claim 8 wherein:
the second brake is a hydraulically-actuated, friction band brake.

12. The transmission mechanism of claim 8 wherein:
the sun gear of the first gearset and the sun gear of the second gearset are journalled on the input.

13. The transmission mechanism of claim 8 wherein:
the sun gear of the third gearset is journalled on the output.

14. A multiple speed transmission mechanism comprising:
   an input;
   an output;
   a first and second planetary gearsets, each gearset including a sun gear, a ring gear surrounding the sun gear, a set of planet pinions meshing with the sun gear and the ring gear, and a carrier on which the planet pinions are rotatably supported, the carrier of the first gearset being driveably connected to the ring gear of the second gearset;
   a third gearset driveably connected to the carrier of the second gearset and the ring gear of the first gearset for alternately driving the output at a predetermined lower speed relative to a speed of the carrier of the second gearset, and driving the output at substantially the speed of the ring gear of the first gearset;
   a first clutch for alternately driveably connecting and disconnecting the input and the sun gear of the first gearset;
   a second clutch for alternately driveably connecting and disconnecting the input and the sun gear of the second gearset;
   a third clutch for alternately driveably connecting and disconnecting the input and the carrier of the first gearset;
   an overrunning brake for alternately holding the carrier of the first gearset against rotation on the transmission housing and releasing the carrier of the first gearset;
   a first brake for alternately holding the sun gear of the first gearset against rotation on the transmission housing and releasing the sun gear of the first gearset; and
   a second brake for alternately holding the carrier of the first gearset against rotation on the transmission housing and releasing the carrier of the first gearset.

15. The transmission mechanism of claim 14 wherein:
the first clutch, second clutch and third clutches are hydraulically-actuated, friction disc clutches.

16. The transmission mechanism of claim 14 wherein:
the first brake is a hydraulically-actuated, friction disc brake.

17. The transmission mechanism of claim 14 wherein:
the second brake is a hydraulically-actuated, friction band brake.

* * * * *